(12) United States Patent
Fang et al.

(10) Patent No.: US 12,244,740 B2
(45) Date of Patent: Mar. 4, 2025

(54) INTEGRATED CIRCUIT FOR ADAPTIVE PUF STABILIZATION PROCESS

(71) Applicant: Intelligent Information Security Technology Inc., Hsinchu (TW)

(72) Inventors: Wai-Chi Fang, Hsinchu (TW); Nicolas-Jean Roger Fahier, Hsinchu (TW); Meng-Ting Wan, Hsinchu (TW); Hao-Ting Lin, Hsinchu (TW)

(73) Assignee: Intelligent Information Security Technology Inc., Hsinchu (TW)

( * ) Notice: Subject to any disclaimer, the term of this patent is extended or adjusted under 35 U.S.C. 154(b) by 313 days.

(21) Appl. No.: 18/091,580

(22) Filed: Dec. 30, 2022

(65) Prior Publication Data

US 2024/0187261 A1 Jun. 6, 2024

(30) Foreign Application Priority Data

Dec. 2, 2022 (TW) .................................. 111146395

(51) Int. Cl.
*H04L 9/32* (2006.01)
*G06F 21/75* (2013.01)

(52) U.S. Cl.
CPC ............ *H04L 9/3278* (2013.01); *G06F 21/75* (2013.01)

(58) Field of Classification Search
CPC . H04L 9/3278; H04L 9/0866; H04L 2209/12; H04L 2209/26; H04L 2209/34; H04L 9/32; G06F 21/75; G06F 21/73; G09C 1/00
See application file for complete search history.

(56) References Cited

U.S. PATENT DOCUMENTS

| 9,276,583 | B1 * | 3/2016 | Satpathy ......... H03K 19/17768 |
| 2021/0110067 | A1 * | 4/2021 | Suresh .................... G06F 21/31 |

* cited by examiner

*Primary Examiner* — Quazi Farooqui

(57) ABSTRACT

An IC for adaptive PUF stabilization process includes a PUF stabilizer and a non-volatile memory. The PUF stabilizer has PUF units, a statistic processor, a majority voting generator, and a dark-bit masker. The statistic processor is connected to the PUF units, and performs measurements on the PUF units to output results. The majority voting generator is connected to the statistic processor to accumulate the results into a statistic result, which is output as a PUF bit. The dark-bit masker is connected to the PUF units, and marks unstable PUF units bit as dark-bit and create dark-bit masks. The non-volatile memory is connected to the PUF stabilizer to store the dark-bit masks, and the dark-bits are replaced by specific bit sequences provided by the PUF stabilizer. This decreases bit error rates of the PUF measurement results, and allows customization of the quantity of dark bits per dark-bit mask used.

10 Claims, 5 Drawing Sheets

INTEGRATED CIRCUIT FOR ADAPTIVE PUF STABILIZATION PROCESS

REFERENCE TO RELATED APPLICATIONS

The present application is based on, and claims priority from, Taiwan Application Serial Number 111146395 filed Dec. 2, 2022, the disclosure of which is hereby incorporated by reference herein in its entirety.

BACKGROUND OF THE INVENTION

1. Technical Field

The present invention relates to information security, and more particularly to an integrated circuit (IC) of an adaptive physically unclonable function (PUF) stabilization.

2. Description of Related Art

A PUF (Physical Unclonable Function) or PUF source is an emerging encryption component, usually used for encryption/decryption. It serves to extract random differences between logic gate circuits or connecting cables (leading wires) in an integrated circuit (IC) caused by technical inconsistency during manufacturing, and use theses random differences to generate an encrypted (response) signal following a certain rule, so as to address security issues of keys during generation, use, storage, and destruction.

A PUF-based response signal is generated automatically when the related device is powered, and the signal goes off when the device is unpowered. Therefore, where a PUF-based response signal is used as an encryption key, there is no need to store the key in a memory, thereby eliminating security concerns about key storage. In addition, the PUF technology has advantageous features like simplicity in terms of principle and structure, low power consumption, physical unclonablility, and unpredictability, making it valuable and promising for research and applications in the field of information security.

Since the traditional PUFs require significant hardware resources, cost restriction can prevent it from realizing an encryption application where the security is satisfying, such as RFID systems. The existing PUF structures all suffer from high hardware costs, poor security, and low reliability. Besides, it currently depends on heavyweight error-correcting codes, which means bulky computation, high overheads for physical implementation, and high costs for chip manufacturing.

SUMMARY OF THE INVENTION

One objective of the present invention is to provide an IC for adaptive PUF source stabilization working with a high-compatibility, stable algorithm. The circuit is satisfying in both correction and security, and is suitable for cross processes, in particular semi-conductor processes and cross-type of PUF source architectures.

The present invention provides an IC to stabilize a PUF source adaptively, comprising: a PUF stabilizer and a non-volatile memory.

The PUF stabilizer has a plurality of PUF units, a statistic processor, a majority voting generator, and a dark-bit masker. Among the PUF units, some are unstable and the other are stable. The statistic processor is telecommunicatively connected to the PUF units, respectively, and each configured to perform a plurality of measurements on a single one of the PUF units in a predetermined period and output a statistic result which is an accumulated sum of results responding to the measurements. The majority voting generator is telecommunicatively connected to the statistic processor, and outputs a PUF bit according to the statistic result. The PUF bit is one bit. The dark-bit masker is telecommunicatively connected to the PUF units, respectively, to mark the unstable the PUF units as dark-bit masks.

The non-volatile memory is telecommunicatively connected to the PUF stabilizer, and each configured to store one or more dark-bit masks each having plural dark bits replaced by a specific sequence provided by the PUF stabilizer.

In a preferred embodiment, further, each of the PUF units composing the PUF source has an error rate, so that when the PUF unit receives the measurements, the measurements are output as different results due to the error rate.

In a preferred embodiment, further, when the non-volatile memory is unpowered, the dark-bit masks are still stored in the non-volatile memory.

In a preferred embodiment, further, the majority voting generator determines a half value of a quantity of the measurements, so that when the statistic result is greater than the half value, the PUF bit is 1, and when the statistic result is smaller than the half value, the PUF bit is 0.

In a preferred embodiment, further, the PUF stabilizer further comprises:

a plurality of multi-round stabilization units, telecommunicatively connected to the statistic processor in parallel, each having a determination strength, and each configured to determine a dark-bit mask for each of the different results of the measurements of each of the PUFs unit according to the determination strength through calculation;

a plurality of accumulators, telecommunicatively connected to the multi-round stabilization units in one-to-one correspondence, and each configured to count and sum up a quantity of the dark bits within the dark-bit mask;

a plurality of registers, telecommunicatively connected to the accumulators in one-to-one correspondence, and each configured to register the dark-bit mask; and a selector, telecommunicatively connected to the accumulators and the registers, preset with a predetermined quantity of dark bits, and configured to select the dark-bit mask according to the predetermined quantity of dark bits.

Furthermore, the PUF stabilizer has a first stable value, a second stable value, and a loop count value to limit the number of process iterations to a certain maximum, in which the statistic result is compared to a first constant that is a difference between a quantity of times of accumulating the different results and a predetermined value preset in the multi-round stabilization unit, so that when the statistic result is greater than the first constant, the first stable value is set to be the reverse of its initial value, and the statistic result is compared to a second constant that is the predetermined value, so that when the statistic result is smaller than the second constant, the second stable value is set to be the reverse of its initial value. Then the loop count value is incremented.

Furthermore, the first stable value is 1, the second stable value is 1, and the loop count value is 0. These are all initial default values, and the loop count value is incremented until a defined number before breaking the loop process.

In a preferred embodiment, further, the PUF stabilizer further comprises:

a dark-bit scanner, for receiving the dark-bit mask and separating the dark-bit mask into dark bit locations and stable bit locations;

a stable bit extractor, telecommunicatively connected to the majority voting generator, and each configured to receive the stable bit locations, so that when a second PUF bit stream is input, a stable bit stream can be output; and a PUF bit-quantity rebuilder, telecommunicatively connected to the majority voting generator, and configured to receive the dark bit locations, so that when the PUF bit stream is input, a PUF bit stream of a mask can be output.

Furthermore, the PUF stabilizer also comprises:

a set of generators, telecommunicatively connected to the stable bit extractor, and configured to receive the stable bit stream and separate the stable bit stream into a plurality of sets of stable bit sequences; and a minority voting generator, telecommunicatively connected to the set of generators, and configured to receive the stable bit sequence, to form a mask bit stream, and to input the mask bit stream into the PUF bit-quantity rebuilder.

Furthermore, the second PUF bit stream and the PUF bit stream are generated at different time points, and the masked PUF bit stream error rate is not greater than the PUF bit stream.

DETAILED DESCRIPTION OF THE INVENTION

Figure 1:
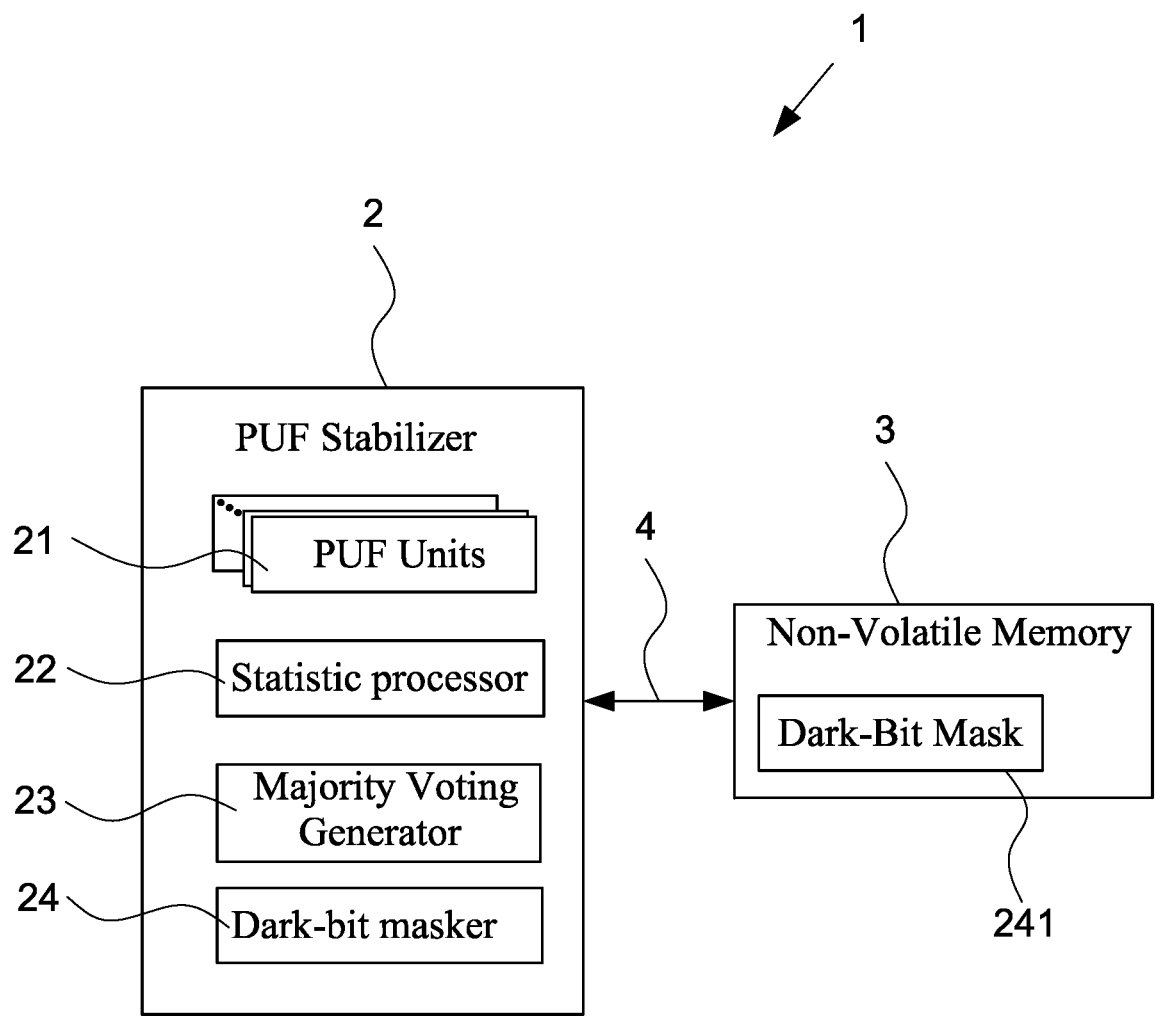
FIG. 1 is a simplified block diagram of an adaptive PUF stabilization according to the present invention.

Different embodiments or examples of implementation of the different characteristics of the subject matter will be disclosed below. Therein, components and arrangements may be described according to specific instances for simplifying the disclosure. It is to be noted that these are exemplificative but not limiting. For example, in the following description, a statement stating that a first features is formed above or on the second feature may cover an instance in which the first feature and the second feature are such formed that they contact each other directly, and may cover an instance in which an additional feature is arranged between the first feature and the second feature so that the first feature and the second feature do not contact each other directly. Furthermore, throughout the disclosure, reference numbers and/or letters may be reused across different instances. Such reuse is for the purpose of conciseness and clearness, and is not intended to indicate relations among the described embodiments and/or configurations.

Moreover, for the sake of explanation, spatial descriptions, such as "beneath," "below," "lower," "above," and "upper" may be used to describe the relation between one element or feature and another element or feature in the drawings. These spatial descriptions are intended to include orientations for operation or use that are different from that shown in the drawings. The shown devices may be orientated differently (such as 90 degrees from the shown orientation or having other orientations) and the spatial descriptions used herein may be construed correspondingly in the same way.

As a hardware-based security solution, PUFs obtain unique and robust sequences through the variations of the semiconductor technology. These sequences may be used as root secrets that support the entire trust root. Many units may be used as sources of PUFs, such as SRAM units, MRAM units, and latch-based circuits. These units are naturally affected by marginal error rates. Therefore, to obtain stable PUF results, correction methods are required.

These correction methods mainly have two stages, one for stabilization, and the other for correction. A more common error-correcting algorithm is the use of error-correcting codes (ECC), which can fix errors not exceeding a certain quantity of bits. In the initial stage, auxiliary data are generated by an ECC and then stored into a non-volatile memory. The quantity of the auxiliary data is related to not only the quantity of PUF units, but also the strength of the algorithm. In other words, when there are more faulty bits to correct, more auxiliary data will be stored. On the other hand, the conversion rate of an ECC is not perfect. That is to say, the bit quantity of the result output by an ECC is smaller than that of the input PUF source. Hence, regardless of the storage requirement and PUF unit quantity, it is always desired to control the load caused by use of ECCs. To this end, stabilization is necessary.

Common approaches to stabilization include time majority voting and dark-bit masks. With majority voting, this is about detecting the behavior pattern of a PUF unit in a time period and simplifies the result by dichotomy. That is to say, the result of time majority voting represents the statistic value of the PUF unit in a certain time period. This is very effective with units having low probabilities of oscillation. With dark-bit mask, stabilization involves first selecting an oscillating unit as a dark bit in the registration stage and storing a dark bit mask in an external non-volatile memory. In a re-generation stage, the dark bit is identified by reading the mask and replaced with a specific value.

The use of dark-bit masks helps deal with units having high probabilities of oscillation, but it reduces the quantity of effective bits in a PUF. A PUF design of full dark-bit masking (every PUF unit is masked by a specific value) is not superior to storing secret values in a one-time programmable read-only memory in terms of security. It is obvious that, for satisfying PUFs while providing sufficient security, using dark-bit masking with care is important. In most PUF designs, stabilization algorithms are designed specifically for certain PUF unit design or PUF source, and may be unsuitable for another PUF unit design. In other words, functional limitation may be seen when a stable algorithm is not matching with the current PUF entropy source in use.

The present invention discloses an IC for adaptive PUF stabilization, which uses a multi-round window to extract certain PUF units as a dark bit having a specific dark bit value. Referring to FIG. 1, the disclosed IC of stabilization comprises a PUF stabilizer 2 and a non-volatile memory 3.

The PUF stabilizer 2 comprises a plurality of PUF units 21, a statistic processor 22, a majority voting generator 23, and a dark-bit masker 24.

The PUF units 21 include several unstable PUF units and several stable PUF units. The PUF unit has an error rate. When the PUF unit receives the measurements, the measurements are output as different results due to the error rate.

The statistic processor 22 is telecommunicatively connected to the PUF units 21, respectively. The statistic processor 22 performs a plurality of measurements on a single one of the PUF units in a predetermined period and output a statistic result which is an accumulated sum of different results of the measurements.

The majority voting generator 23 is telecommunicatively connected to the statistic processor 22, and outputs the statistic result as a PUF bit. The PUF bit is one bit. In the present embodiment, the majority voting generator determines a half value of a quantity of the measurements. When the statistic result is greater than the half value, the PUF bit is 1, and when the statistic result is smaller than the half value, the PUF bit is 0.

The dark-bit masker 24 is telecommunicatively connected to a plurality of PUF units 21, respectively. The dark-bit masker 24 marks several unstable PUF units as several dark-bit masks 241.

The non-volatile memory 3 is telecommunicatively connected to the PUF stabilizer 2 and stores the several dark-bit masks 241. The dark-bit masks 241 have several dark bits, replaced by a specific sequence provided by the PUF stabilizer 2. When the non-volatile memory 3 is unpowered, the dark-bit masks 241 are still stored in the non-volatile memory 3.

It is also to be mentioned that depending on operational purposes, there are two stages: masking and re-composition. In the masking stage, the bit feature of the present PUF, namely its dark-bit mask, is extracted and stored into the non-volatile memory. In the re-composition stage, a PUF bit is first created by means of majority voting, and then masked by the dark bit generated in the masking stage.

As shown in FIG. 1, the present invention is composed of a PUF stabilizer capable of providing an adjusted PUF source result and a non-volatile memory that provides stable storage when power is off. A flat ribbon cable 4 forms a data channel between the PUF stabilizer 2 and the non-volatile memory 3, and may be any data communication interface, such as a universal asynchronous receiver/transmitter (UART), a serial peripheral interface (SPI), an inter-integrated circuit (I2C), or an advanced extensible interface (AXI), without limitation.

The PUF stabilizer 2 is primarily composed of the PUF units 21, the statistic processor 22, and the majority voting generator 23, and the dark-bit masker 24. The PUF units 21 may be any kinds of units in any arrangement. The size of the arrangement or the quantity of the units depend on the length of the key permitted by the PUF system.

Figure 2:
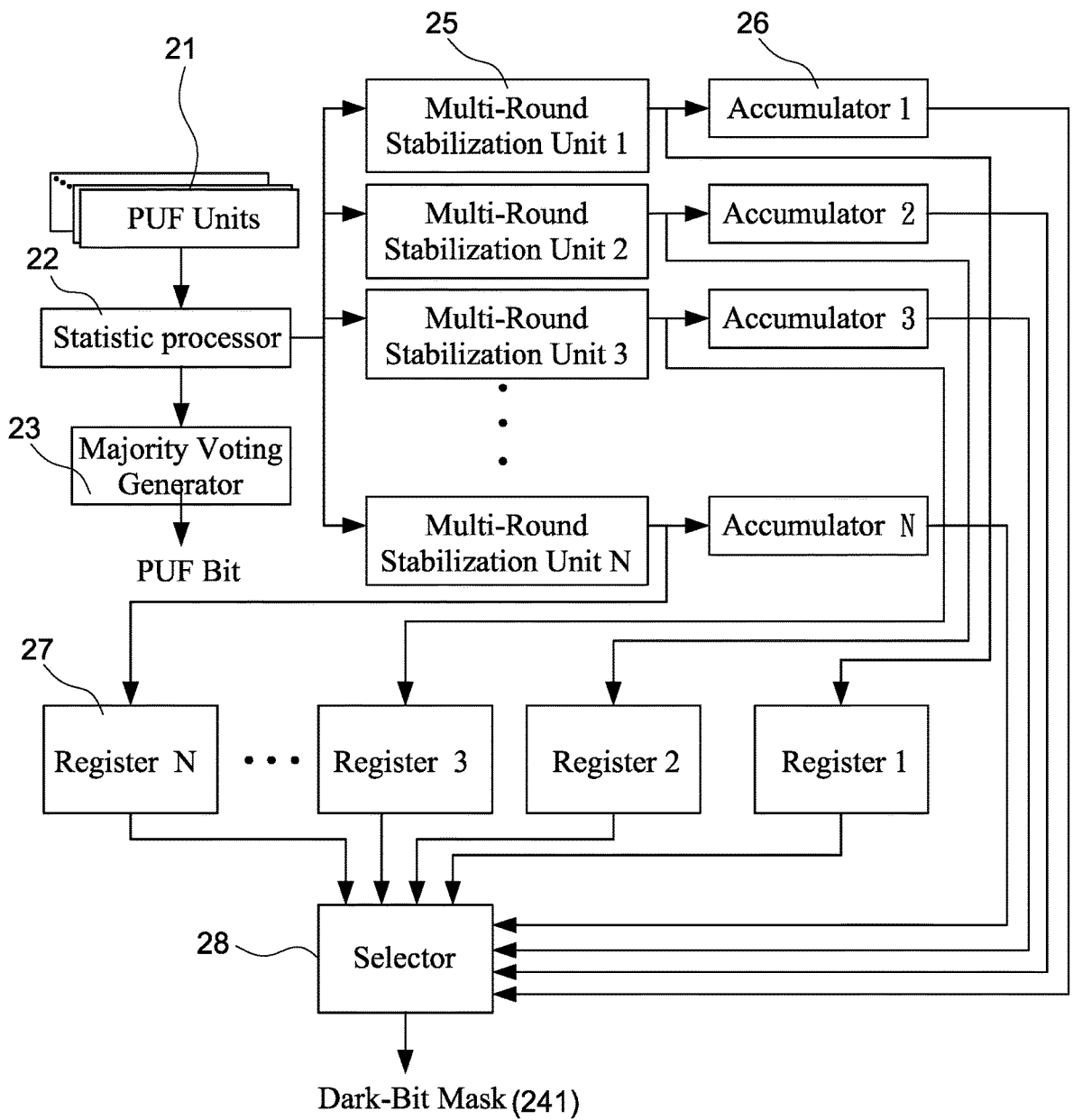
FIG. 2 is a block diagram illustrating creating and storing dark bits into an external memory during PUF step execution according to the present invention.

Also referring to FIG. 2, which is a block diagram of the masking stage, including plural multi-round stabilization units and the corresponding accumulators and collectors. In a preferred embodiment, the PUF stabilizer further comprises: a plurality of multi-round stabilization units 25, a plurality of accumulators 26, a plurality of registers 27, and a selector 28.

The multi-round stabilization units 25 are telecommunicatively connected to the statistic processor 22 in parallel. The multi-round stabilization unit 25 has a determination strength, and determine a dark-bit mask for each of the different results of the measurements of each of the PUFs unit according to the determination strength through calculation.

The accumulators 26 are telecommunicatively connected to the multi-round stabilization units 25 in one-to-one correspondence. The accumulator 26 counts and sums up the quantities of dark bits of the PUF units 21.

The registers 27 are telecommunicatively connected to the accumulators 26 in one-to-one correspondence. The register 27 registers the dark-bit masks obtained by the multi-round stabilization unit 25.

The selector 28 is telecommunicatively connected to the accumulators 26 and the register 27. The selector 28 is preset with a predetermined quantity of the dark bits, and selects the dark-bit mask according to the predetermined quantity of the dark bits.

Therein, the PUF stabilizer has a first stable value, a second stable value and a loop count value to limit the number of process iterations to a certain maximum. The statistic result is compared to a first constant that is a difference between a quantity of times of accumulating the different results and a predetermined value preset in the multi-round stabilization unit, so that when the statistic result is greater than the first constant, the first stable value is set to be the reverse of its initial value, and the statistic result is compared to a second constant that is the predetermined value, so that when the statistic result is smaller than the second constant, the second stable value is set to be the reverse of its initial value. Then the loop count value is incremented.

It is to be noted that, in the present embodiment, the first stable value is 1, the second stable value is 1, and the loop count value is initially 0. These are also initially set, and the loop count value is incremented until a defined number before breaking the loop process.

Additionally, the accumulator 26 counts and simplifies features of the PUF unit 21 in a time period for the statistic processor 22. The majority voting generator 23 is a binary classifier for digits. It classifies every PUF unit as 0 or 1 using one or more statistics, and generates a Boolean mapping, which is the PUF bit.

Figure 3:
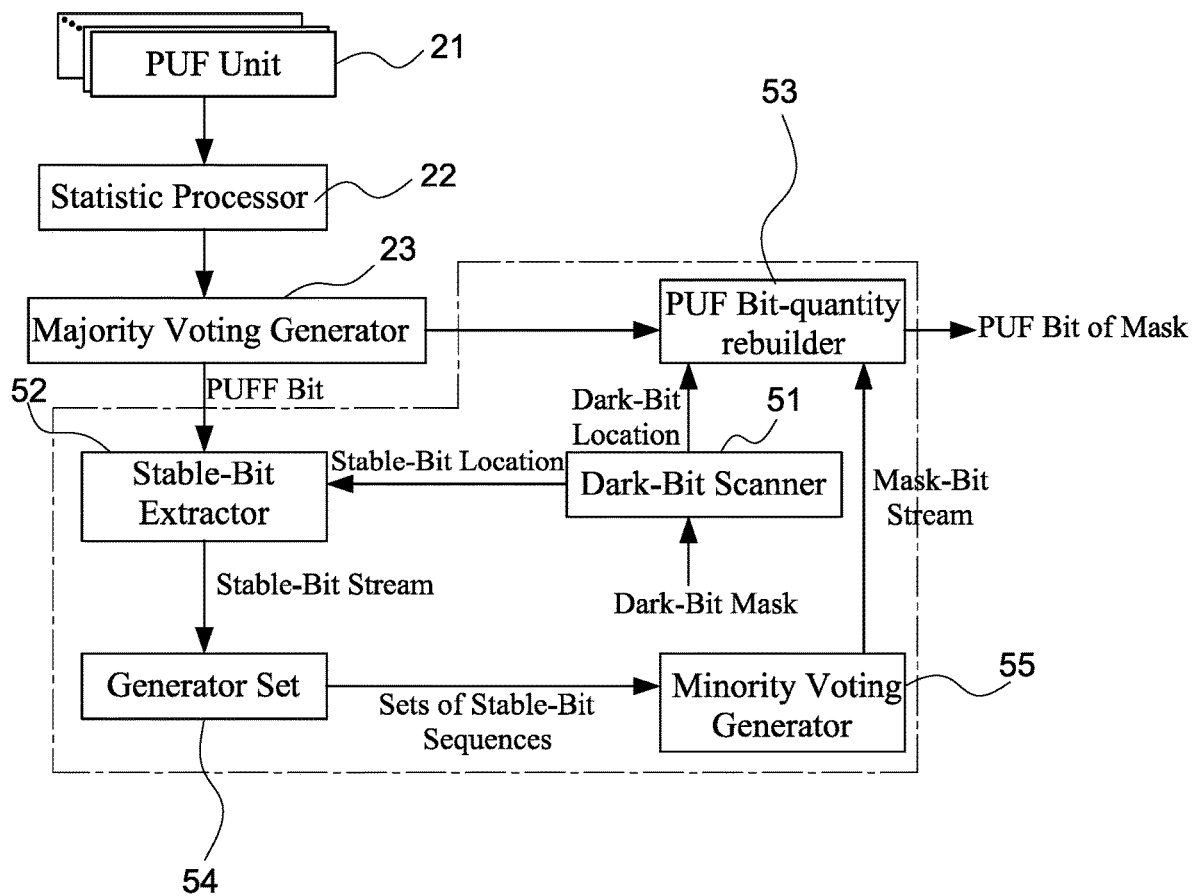
FIG. 3 is a block diagram of PUF re-composition stage where a dark-bit mask is used to correct the present PUF bit stream according to the present invention.

Referring to FIG. 3, in another preferred embodiment, the PUF stabilizer further comprises: a dark-bit scanner 51, a stable bit extractor 52, a PUF bit-quantity rebuilder 53, a set of generators 54, and a minority voting generator 55.

The dark-bit scanner 51 receives dark-bit mask 241, and split the dark-bit mask 241 into dark bit locations and stable bit locations.

The stable bit extractor 52 is telecommunicatively connected to the majority voting generator 23. The stable bit extractor 52 receives the stable bit locations, so that when a second PUF bit stream is input, a stable bit stream can be output.

The PUF bit-quantity rebuilder 53 is telecommunicatively connected to the majority voting generator 23. The PUF bit-quantity rebuilder 53 receives the dark bit locations, so that when the PUF bit stream is input, the masked PUF bit stream can be output.

The set of generators 54 and the stable bit extractor 52 are in mutual telecommunicatively connection. The generators 54 receive the stable bit stream, and split the stable bit stream into plural sets of stable bit sequences.

The minority voting generator 55 is telecommunicatively connected to the set of generators 54. The minority voting generator 55 receives the stable bit sequences and form a mask bit stream, and inputs the mask bit stream into the PUF bit-quantity rebuilder 53.

Therein, the second PUF bit stream and the PUF bit stream are generated at different time points, and the masked PUF bit stream error rate is not greater than the PUF bit stream error rate.

It is also to be explained that the dark-bit mask is a convergence of information containing dark bits, so we need to decode the dark-bit mask into stable and dark-bit locations first in the re-composition stage. In FIG. 3, the dark-bit scanner converts the dark-bit mask read from the memory into locations of dark bits and stable bits, and obtains the corresponding values.

Then, the set of generators split the stable bit sequence into several groups. In every group, one bit value is obtained through voting and used as result of one dark bit in the dark-bit mask. Minority voting is used for the groups due to two considerations. The first is its fault tolerance. Even if the content of a group changes, the final value may remain the same. In addition, in a good PUF design, the hamming weight shall be close to 50%, which means that the total numbers of 0 and 1 shall be similar. Therefore, minority voting is seen as a compensation technique to ensure that the final generated masked PUF bit stream has a good hamming weight. All the foregoing functional blocks require PUF statistics as their inputs, making it extremely important to generate and output statistics stably.

Figure 5:
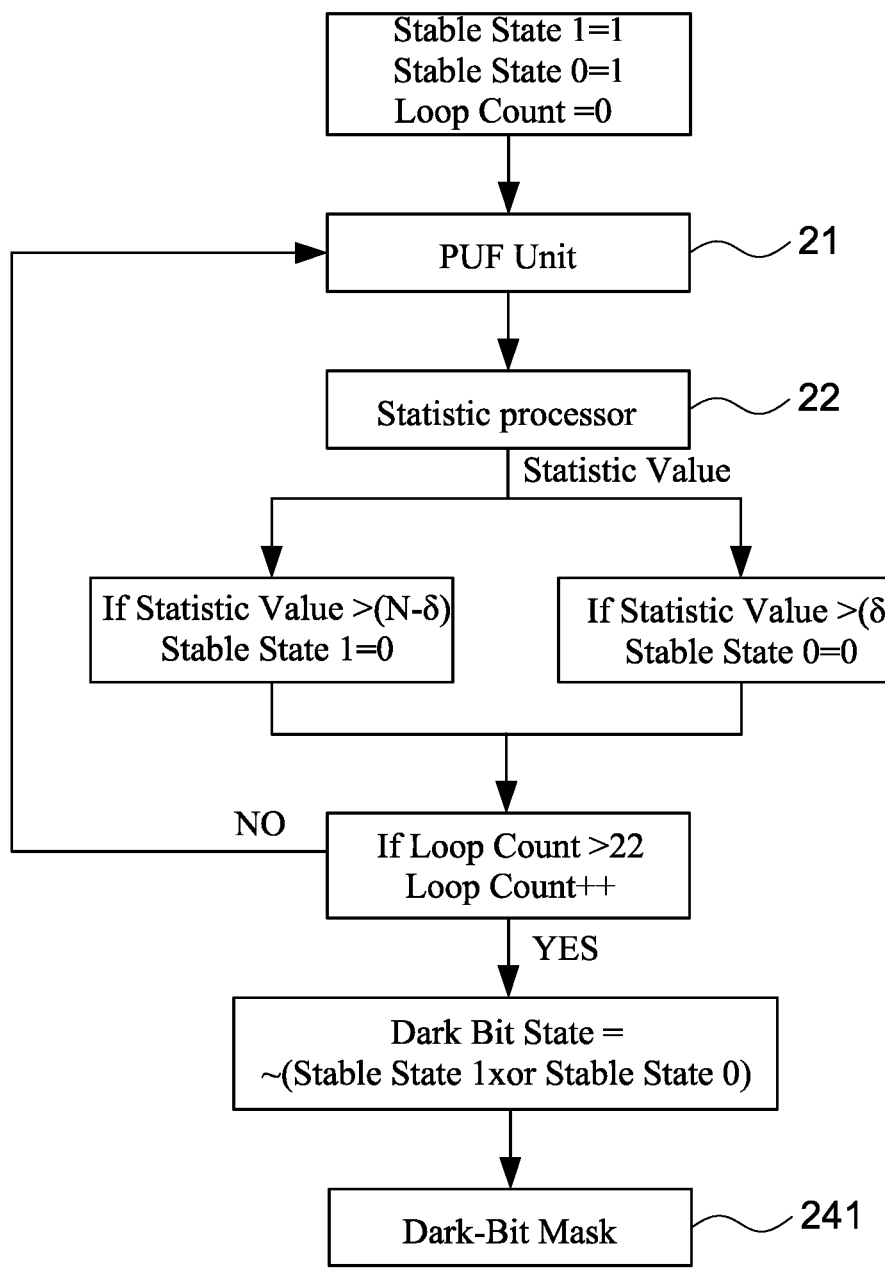
FIG. 5 is a flowchart illustrating that each PUF unit measurement is classified through a multi-round stabilization unit in three different states according to the present invention.

In addition, dark-bit masks are treated differently in two different stages: masking and re-composition. In the masking stage, every PUF unit is identified as being in one of three states: Stable 0, Stable 1, and Dark Bit. The block diagram and the flowchart are as shown in FIG. 2 and FIG. 5, respectively. In this stage, dark-bit masks are also stored in the non-volatile memory. For the re-composition stage, the mask is read to mask the present PUF bit stream (as shown in FIG. 3).

Figure 4:
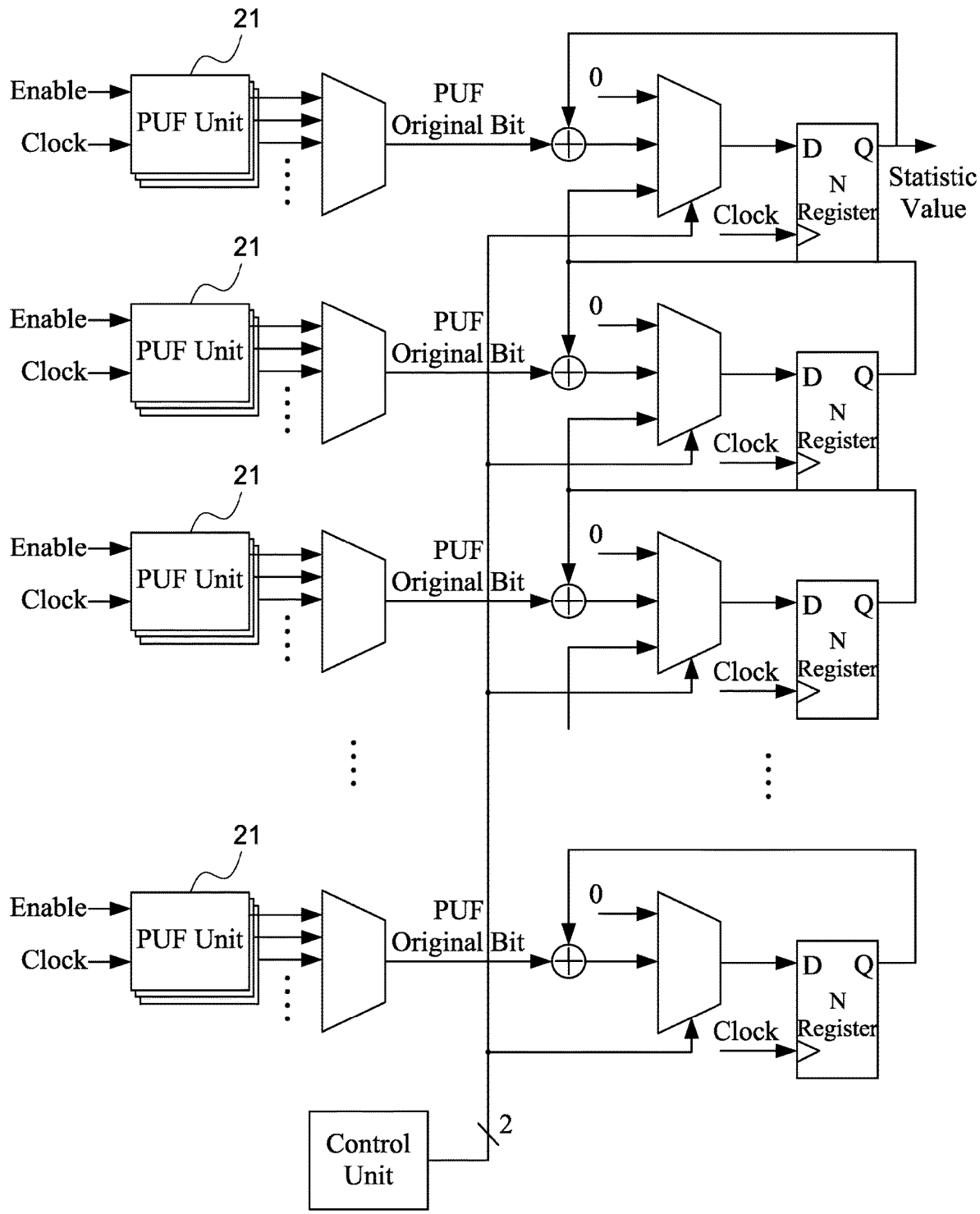
FIG. 4 is a schematic diagram showing a PUF statistic unit that has three control modes according to the present invention.

Referring to FIG. 4, which is a schematic diagram of the statistic processor according to a non-limiting example. N bit registers are used to store and accumulate statistic information. The magnitude of N is determined by the maximum accumulated count. The register has three input modes, including the accumulation mode, the output mode, and the reset mode. With the output mode, the statistic processor outputs statistics data as a shift register.

Referring to FIG. 5, which is a flowchart of a single stabilization unit. Different units have different $\delta$ values, representing different filter strength. Every unit determines whether a unit is a dark bit according to the statistic information of plural PUF units. All the dark-bit masks are stored in the corresponding collectors. Meanwhile, the accumulator counts the total number of dark bits generated in the stabilization unit. At last, the selector selects the most proper dark-bit mask according to the length of the key permitted by the system, and stores it in the non-volatile memory. For a single multi-round stabilization unit, there are two variables used to represent the state of the unit, namely Stable 1 and Stable 0, each having a default value of 1.

As shown in FIG. 5, the stabilization unit in every round evaluates the state of the present statistic, and determines whether the variables have to be altered. When all the rounds have been finished, the final results of the two variables represent the state of the PUF unit during execution. If both of the values are 0, it means that the result states of the PUF unit are conflicting, and this is regarded as a dark bit.

The following description is made for the parameters shown in FIG. 5. N is the accumulated, total number of PUF unit measurements, and represents the sampling time of a single statistic. R is the quantity of rounds, and represents the length of the entire sampling time. The magnitude of $\delta$ has impact on the strength of the stabilization unit, ranging from 0 to N/2. The smaller $\delta$ is, the stronger it is. N and R may be adjusted according to needs, but have to be consistent in all stabilization units, while $\delta$ is different in every unit so as to find out the optimal dark-bit mask adaptively.

To sum up, the IC for adaptive PUF stabilization of the present invention has the following advantages:

1. It reduces the error code rate of a PUF unit, making the generated results more consistent;
2. It accommodates dark bits of an expected quantity, helping to maintain enough effective PUF bits; and
3. For a single PUF unit, it uses multi-round evaluation to prevent loss of any possible dark bit, and identifies the most unstable PUF units as dark bits first. This design provides a PUF stabilization solution across processes and across different PUF source entropy types.

The description of the technical contents of the present invention is made to enable people skilled in the art to understand various aspects of the disclosure. As will be appreciated by people skilled in the art, they can easily use the disclosure as the basis to design or modify existing processes and structures to implement the purposes as those of the embodiments described herein and/or to achieve the advantages as those provided by as those. It is also to be recognized by people skilled in the art that these equivalent structures are not departing from the spirit and scope of the disclosure and may be altered, replaced, and modified in various ways without departing the spirit and scope of the disclosure.

What is claimed is:

1. An IC for an adaptive PUF stabilization process, comprising:
    a PUF stabilizer, having:
        a plurality of PUF units, including unstable PUF units and stable PUF units;
        a statistic processor, telecommunicatively connected to the PUF units, respectively, and each configured to perform a plurality of measurements on a single one of the PUF units in a predetermined period and output a statistic result which is an accumulated sum of different results of the measurements;
        a majority voting generator, telecommunicatively connected to the statistic processor, and each configured to output the statistic result as a PUF bit;
        a dark-bit masker, telecommunicatively connected to the PUF units, respectively, and each configured to mark the unstable PUF units as dark-bit masks; and
    a non-volatile memory, telecommunicatively connected to the PUF stabilizer, and each configured to store the dark-bit masks each having plural dark bits replaced by a specific sequence provided by the stabilization process.

2. The IC for adaptive PUF stabilization process of claim 1, wherein each of the PUF units has an error rate, so that when the PUF unit receives the measurements, the measurements are output as different results due to the error rate.

3. The IC for adaptive PUF stabilization process of claim 1, wherein when the non-volatile memory is unpowered, the dark-bit masks are still stored in the non-volatile memory.

4. The IC for adaptive PUF stabilization process of claim 1, wherein the majority voting generator determines a half value of a quantity of the measurements, so that when the statistic result is greater than the half value, the PUF bit is 1, and when the statistic result is smaller than the half value, the PUF bit is 0.

5. The IC for adaptive PUF stabilization process of claim 1, wherein the PUF stabilizer further comprises:

a plurality of multi-round stabilization units, telecommunicatively connected to the statistic processor in parallel, each having a determination strength, and each configured to determine a dark-bit mask for each of the different results of the measurements of each of the PUFs unit according to the determination strength through calculation;

a plurality of accumulators, telecommunicatively connected to the multi-round stabilization units in one-to-one correspondence, and each configured to count and sum up a quantity of dark bits within the dark-bit mask;

a plurality of registers, telecommunicatively connected to the accumulators in one-to-one correspondence, and each configured to register each dark-bit mask; and a selector, telecommunicatively connected to the accumulators and the registers, preset with a predetermined quantity of the dark bits, and configured to select the dark-bit mask according to the predetermined quantity of the dark bits.

6. The IC for adaptive PUF stabilization process of claim 5, wherein the PUF stabilizer has a first stable value, a second stable value, and a loop count value to limit the number of process iterations to a certain maximum, in which the statistic result is compared to a first constant that is a difference between a quantity of times of accumulating the different results and a predetermined value preset in the multi-round stabilization unit, so that when the statistic result is greater than the first constant, the first stable value is set to be the reverse of its initial value, and the statistic result is compared to a second constant that is the predetermined value, so that when the statistic result is smaller than the second constant, the second stable value is set to be the reverse of its initial value.

7. The IC for adaptive PUF stabilization process of claim 6, wherein the first stable value is initially 1, the second stable value is initially 1, and the loop count value is initially 0 up to a defined number of iteration.

8. The IC for adaptive PUF stabilization process of claim 1, wherein the PUF stabilizer further comprises:

a dark-bit scanner, for receiving the dark-bit mask and separating the dark-bit mask into dark bit locations and stable bit locations;

a stable bit extractor, telecommunicatively connected to the majority voting generator, and each configured to receive the stable bit locations, so that when a second PUF bit stream is input, a stable bit stream can be output; and a PUF bit-quantity rebuilder, telecommunicatively connected to the majority voting generator, and configured to receive the dark bit locations, so that when the PUF bit stream is input, a masked PUF bit stream can be output.

9. The IC for adaptive PUF stabilization process of claim 8, wherein the PUF stabilizer further comprises:

a set of generators, telecommunicatively connected to the stable bit extractor, and configured to receive the stable bit stream and separate the stable bit stream into a plurality of sets of stable bit sequences; and a minority voting generator, telecommunicatively connected to the set of generators, and configured to receive the stable bit sequences, to form a mask bit stream, and to input the mask bit stream into the PUF bit-quantity rebuilder.

10. The IC for adaptive PUF stabilization process of claim 8, wherein the second PUF bit stream and the PUF bit stream are generated at different time points, and the masked PUF bit stream error rate is not greater than the PUF bit stream error rate.

* * * * *